United States Patent Office 3,560,363
Patented Feb. 2, 1971

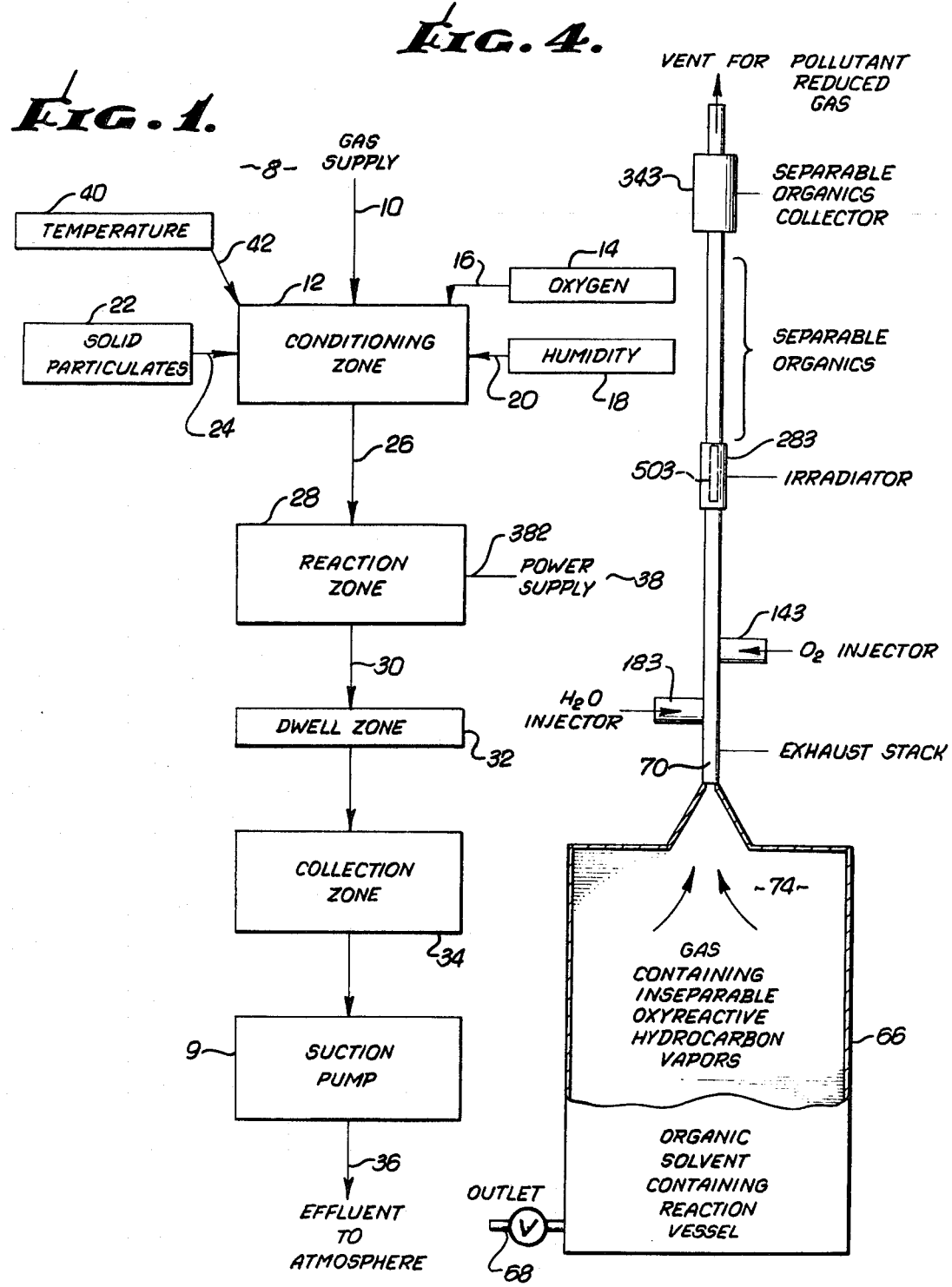

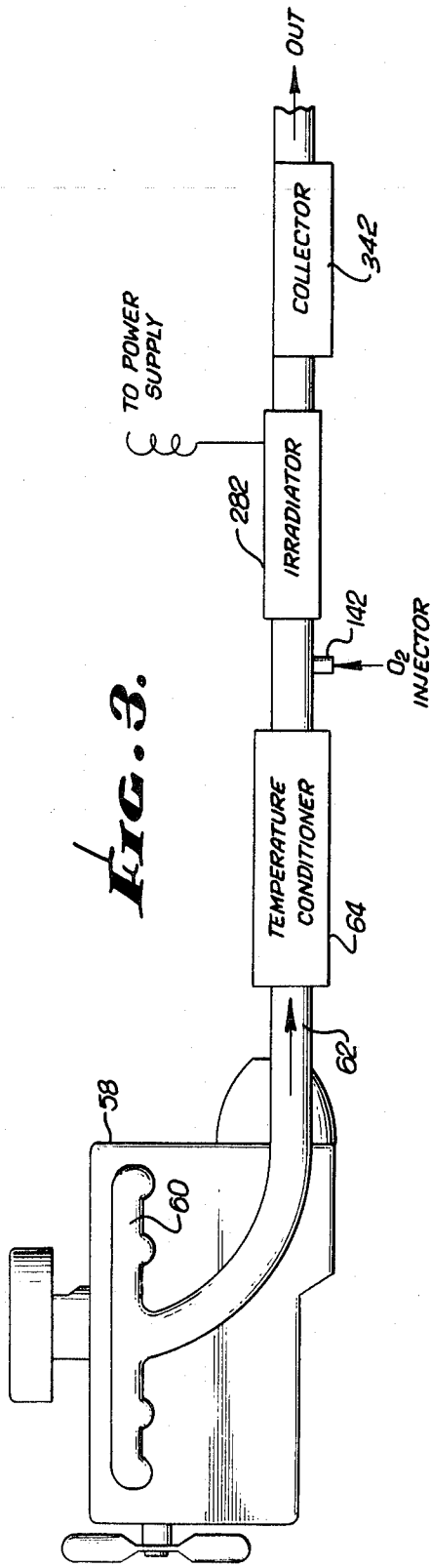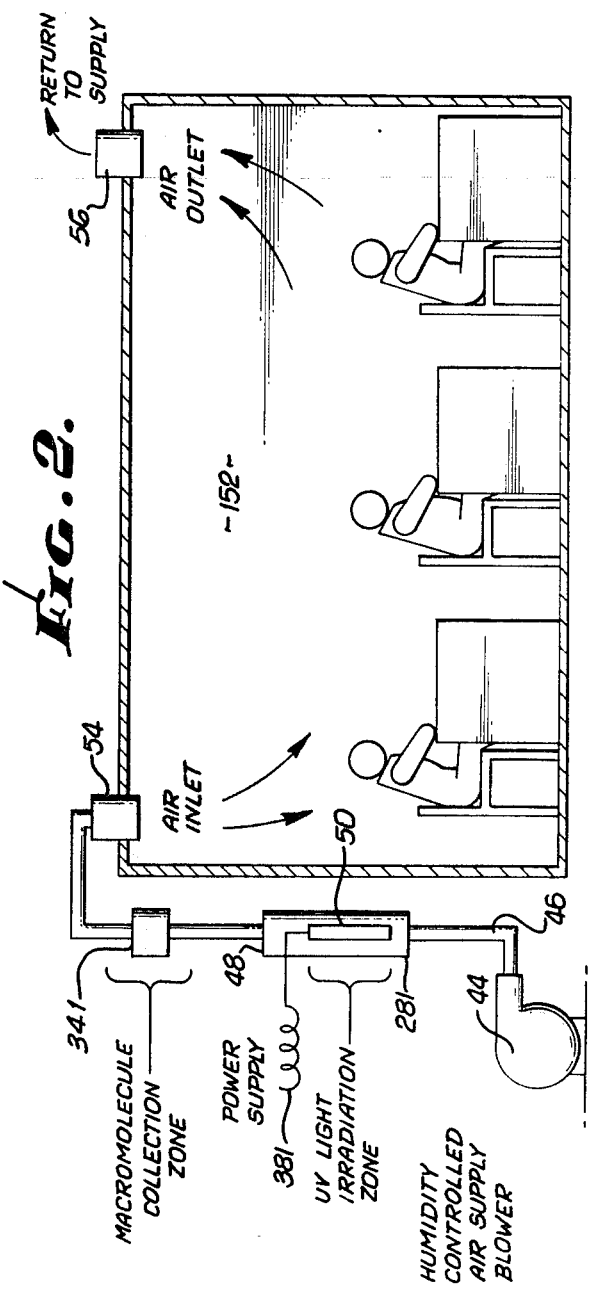

3,560,363
METHOD FOR CONTROL OF OXYREACTIVE HYDROCARBON LEVELS IN OXYGEN-CONTAINING GASES
Alexander Goetz, Los Angeles, Calif., assignor to Alexander Goetz, trustee of the Goetz family trust
Filed Sept. 26, 1967, Ser. No. 676,369
Int. Cl. B01j 1/10, 1/14
U.S. Cl. 204—162                               27 Claims

ABSTRACT OF THE DISCLOSURE

The smog-generating potential of a gas to be released to the atmosphere such as auto exhaust gas or the gaseous effluent from a chemical process vessel is lowered prior to release of the gas to the atmosphere by converting the smog precursor compounds, i.e. oxyreactive hydrocarbons, which are molecularly dispersed in the gas into separable particles by irradiation and separating the particles thus produced.

BACKGROUND OF THE INVENTION

(1) Field of the invention

This invention has to do with improvements in the operation and design of potentially smog-generating devices. More particularly, the invention is concerned with methods and apparatus for ameliorating the gaseous effluents of various sources from a smog-generating standpoint.

"Smog" is a coined term used to describe an atmospheric condition characterized by reduced visibility, organism irritation and material deterioration. While the causes of smog are many and still the subject of debate, it is at least settled that under the influence of sunlight certain molecularly disperse constituents of the atmosphere combine to form new chemical entities which are irritating and dangerous to the human organism. The most visible effect of this process is the formation of a haze in the atmosphere which can become so heavy given appropriate weather conditions that visibility can be reduced to less than one mile.

The haze is known to potentiate the irritant effects of smog. Its formation is likely due to the interaction of nitrogen oxides ($NO_x$) with unsaturated hydrocarbons in the presence of sunlight. This reaction is theorized to release ozone which enters into other reactions proliferating the smog. The source of unsaturated hydrocarbon and nitrogen oxide content in the air is primarily the automobile and other internal combustion engine-using devices and secondarily, when controls are not in effect, industry carrying on combustive processes. Unsaturated hydrocarbons are of course also used widely as solvents and are released to the atmosphere in great quantities in and around all major population centers to blend there with the automobile effluent.

The physical nature of visible smog is that of minute particles suspended in the air, a condition herein denominated an "aerocolloid." Because of their small size, these particles will not settle and do not attenuate, but only scatter light, producing visibility restriction by contrast reduction. The hydrocarbons which contribute to aerocolloid formation are those capable of undergoing reaction with oxygen under the conditions encountered in the lower stratum of the atmosphere, which conditions include moisture vapor or humidity, more properly molecularly disperse water, dirt particles from smoke and dust and visible light energy, in the spectral range of 3200–4500 angstroms. These hydrocarbons are herein termed "oxyreactive hydrocarbons" and they include unsaturated hydrocarbons of the atomatic and olefinic types, as well as other hydrocarbons which are reactable to unsaturated states by energy absorption such as cyclohexane. "Non-reactive" hydrocarbons herein are those which are photochemically unreactive to oxygen and which therefore, are not smog-producing.

(2) Prior art

Efforts at controlling the smog-generating potential of various oxyreactive hydrocarbon sources such as the automobile, the chemical handling or processing plant and the petroleum refinery have been preventative rather than curative. Reduced output of these hydrocarbons has been sought by limitations on fuel composition for utilities, on solvents for chemical processing, on carburetor and operation adjustments for auto engines and the like. This invention is concerned rather with the orderly control and elimination of these hydrocarbons following their generation and prior to their emission into the atmosphere. Utilizing the present methods and apparatus, oxyreactive hydrocarbon generating activities may be carried on in the manner most economical from a production standpoint and without uneconomic controls on the input to the system, because the output is treated to reduce its smog-producing potential in a manner effectively prereacting and separating these offending hydrocarbons.

SUMMARY OF THE INVENTION

The present invention has for a major objective the elimination or substantial reduction of oxyreactive hydrocarbon content of gaseous effluents, from stationary or mobile effluent sources, prior to their release to the atmosphere. Essentially this is accomplished by converting these hydrocarbons into separable particles by irradiating the gas containing them from the source and separating the particles from the effluent to be released to the atmosphere.

In particular, the invention provides a method of lowering the smog-generating potential of gas flow which contains molecularly disperse oxyreactive hydrocarbons, prior to its release to the atmosphere, which method includes irradiating the gas to selectively combine into separable particles the oxyreactive hydrocarbons dispersed in the gas and separating the particles thus formed from the gas prior to its dispersal into the atmosphere. Irradiation is generally in the far ultraviolet in wavelength and operates to convert the oxyreactive hydrocarbons by combining them with oxygen and into polymers. The polymers then agglomerate into the separable particles mentioned above which may be separated, e.g. by collection on a surface. Further irradiation may cause decomposition of the particles into innocuous gases, e.g. $CO_2$. Humidity or molecularly disperse water, if present in the gas, increases the number and size of particles produced for any given level of irradiation and the presence of reaction centers, e.g. finely divided, solid material dispersed in the gas can enhance the reaction rate.

Apparatus for carrying out the method is provided including generally means communicating with the gas source for receiving the gas and irradiating to selectively combine the oxyreactive hydrocarbons in the gas into separable particles and means for separating the particles from the gas prior to emission thereof into the atmosphere. Additional means for controlling gas temperature, humidity, the oxygen level and the presence or absence of suspended solids in the gas may also be provided to condition the gas to be irradiated. The irradiating means in general includes a source of 2000 to 2850 angstrom wavelength radiation such as a quartz mercury vapor lamp which may be mounted coaxially in a tubular passageway for uniformly irradiating the gas moving through the passageway.

The invention is capable of numerous specific embodiments and applications among which is an air conditioning system in which the conditioned air is treated to reduce its concentration of oxyreactive hydrocarbons in advance of release to the air conditioned space. Similarly exhaust gases, e.g. from automobiles or any internal combustion engine or gaseous effluents from chemical processing vessels may be treated in accordance with the invention to reduce the smog-generating potential of these sources.

BRIEF DESCRIPTION OF THE DRAWINGS

In the drawings:

FIG. 1 is a schematic of gas stream treatment in accordance with the invention;

FIG. 2 is a schematic view of a room equipped with the present apparatus for specially conditioning the air therein;

FIG. 3 is a schematic view of an internal combustion engine, e.g., for an auto, equipped with the present apparatus to reduce pollutant emissions; and FIG. 4 is a schematic view of a chemical process vessel equipped with a smog-reducing device of the present invention.

DESCRIPTION OF THE PREFERRED EMBODIMENTS

It will be apparent from the above that control of smog precursors, namely oxyreactive hydrocarbons, is predicated on the conversion of these normally inseparable chemical species into a more easily separated form. By utilizing the reactivity of oxyreactive hydrocarbons under irradiation in the far ultraviolet spectral range advantage is taken of their particular property of importance for smog generation, namely their tendency to group themselves into appreciable size particles in the atmosphere.

The conversion of molecularly disperse oxyreactive hydrocarbons into particles is apparently two-stage. First the hydrocarbons are chemically combined into larger molecules, polymers, and these polymers are combined into agglomerates i.e. aggregates of molecules which on reaching about $0.1\mu$ size become detectable by light and separable. Agglomerate growth may continue to form particles of up to $1\mu$ particle size and larger.

With reference to the drawings, in FIG. 1, a gas stream from a source (not shown), whose output of smog-generating hydrocarbons is to be controlled is drawn from a supply generally indicated at 8. Ordinarily the supply will itself provide the motive power for the gas. Alternatively, a passage at either end of the apparatus may be used, e.g. suction pump 9. The indrawn gas moves through line 10 into a conditioning zone 12. There the gas stream is altered as desired for carrying out the conversion reaction. Depending on the composition of the gas, this conditioning may involve introducing oxygen from supply 14 along line 16, molecularly disperse water from supply 18 along line 20, and finely divided particulates as reaction centers or nuclei from supply 22 along line 24. Temperature and pressure of the gas may be adjusted in the conditioning zone as desired for optimal reaction rates. The conditioned gas passes along line 26 to reaction zone 28 which is typically a chamber containing a radiation source. Following irradiation, the treated gas, now containing separable hydrocarbon particles, is passed along line 30, preferably with a brief residence time in dwell zone 32 to allow for particle growth and then to collection zone 34. There the separable particles are eliminated from the gas; which is then passed to atmosphere, essentially free of oxyreactive hydrocarbons, along line 36.

The gas entering the reaction zone 28 typically will comprise atmospheric gases including primarily nitrogen, oxygen, carbon dioxide, and trace noble gases, as well as molecularly disperse water together often with the gaseous products of combustion such as oxyreactive hydrocarbons and nitrogen oxides. If the gas supply 8 is an automobile engine, substantial quantities of carbon dioxide, and of nitrogen oxides, organic lead compounds, carbon monoxide, and aromatic aliphatic hydrocarbons will be present while the oxygen content will be quite reduced and the content of molecularly disperse water will be much enlarged.

Typically the reaction zone 28 will comprise a gas impermeable walled passage of any suitable material such as metal, e.g. stainless steel or glass, ceramic or light stable plastic. Within the passage, a light source is provided including a lamp which may be formed of quartz and filled with an activatable mercury vapor. The lamp may be any device emitting radiation in the desired far ultraviolet range. Thus devices having emission wavelengths below 2850 angstroms, inherently, or by appropriate filtering are useful with innocuous, narrower band, easily controlled radiating devices such as vapor lamps being preferred over other devices. Preferred devices will emit principally in the 2000 to 2850 angstrom wavelength range and preferably emit a minimum of 1800–1900 angstrom radiation, to minimize generation of ozone. Irradiation at wavelengths between 2450 and 2650 has been found to be quite effective for rapidly combining oxyreactive hydrocarbons into separable particles. Power to the reaction zone 28 is provided by power supply 38 along line 382.

It will be noted that the radiation wavelengths employed herein are well below the visible light spectrum and fall into the far ultraviolet range. Thus the radiation used to chemically combine the oxyreactive hydrocarbons in the present method and apparatus is not at a level occurring adjacent the earth surface. Due to the screening by the atmosphere itself, at the earth's surface radiation wavelengths are at 3200 angstroms and above. It is this difference in wavelength of activating radiation that is believed to explain, at least in part, the extremely rapid conversion of oxyreactive hydrocarbon in the present apparatus to particulate matter of an aerocolloidal nature and even in the absence of nitrogen oxides, in comparison with the very slow conversion of these chemicals in the open atmosphere, which conversion there requires presence of such oxides.

Other than the spectral radiation range maximum, the parameters of the present method are widely variable. Pressure appears to play no major role and can range from subatmospheric to superatmospheric or most conveniently may be ambient, e.g. normal atmospheric pressure, i.e., 600 to 760 mm. Hg. Temperature and humidity both play a role in the photochemical reactions. Sample temperatures may be varied from 5° to 95° C. At these temperatures humidity levels between 0 and 99 percent may be employed. Increasing humidity has been found to increase progressively although not necessarily proportionally the number and size of particles produced. As the sample temperature or humidity changes, the relative reactivity of the various organic molecules present in the gas stream also appears to change.

Oxygen present in the gas enters into the particle forming reaction by combining with the oxyreactive hydrocarbons to form what are apparently polyethers, judging from solubility data obtained thereon. Quite small amounts of oxygen, in fact only the stoichiometric equivalent amount is needed to form such polymers, but typically, oxygen levels in the sample, either as obtain in the gas or as added to the gas should be at least ten times the hydrocarbon content, e.g. at least 10 to 1000 parts per million, and may range higher without limit but typically will be between 15% and 30% by volume. Increased oxygen concentration will increase reaction rate.

The separable particles typically contain numerous polymers of at least 100 monomer units and up to 5000 or more units, to correspondingly have molecular weights between 100 and 5000 times greater than that of the hydrocarbon constituents. These polymers are formed rapidly under far ultraviolet irradiation and agglomerate subsequently to form particles in the size range of at least 0.1μ and up to 1μ diameter.

The presence of highly dispersed, submicron dimension particulate matter in the irradiated gas, e.g. nongaseous and nonreactive matter, such as salt crystals formed in situ, has been found to accelerate the reaction, perhaps through the provision of reaction centers and such matter may be added to the gas prior to irradiation, to specially condition the gas.

In FIG. 1, there is shown, upstream of reaction zone 28, various gas conditioning means which are useful depending on desired reaction conditions and on the nature of the gas from supply 8. For example, the oxygen supply 14 feeds oxygen into the gas, if necessary to effect reaction of the oxyreactive hydrocarbons. Ordinarily, the gas, unless from an exhaustive combustion such as an automobile engine may contain molecular oxygen in adequate concentration, i.e., at least a stoichiometric equivalent and more desirably about ten times the quantity of hydrocarbon of oxygen, e.g. 10 to 1000 parts per million of oxygen should be present to insure conversion at a satisfactory rate where hydrocarbon concentrations is between 1 to 100 parts per million. Often more or less atmospheric quantities of oxygen, e.g. from 15% to 30% by volume will be present in the gas. With the oxygen supply 14 connected as shown, the oxygen content of the gas being treated can be increased to virtually any level.

Molecularly disperse water, or alternatively "humidity," has been found to have an effect on the reaction. Accordingly, the apparatus may be provided with a humidity control 18 in the form of water supply or a desiccator connected to the reaction zone 28 through line 20. Control 18 may be in the form of a nebulizer or other delivery device affording control over dispensing, timing and quantity of delivery or be a hygroscopic material. Many gases to be treated will be at desired humidity levels and humidity conditioning will be unnecessary. Effective chemical combination of oxyreactive hydrocarbons under far ultraviolet irradiation to separable particles has been found to occur at desirable rates, e.g. several seconds at moderate radiation dosages, when the sample contains molecularly disperse water in amounts providing a humidity between 0 and 99%. Humidity may be varied to characterize a gas sample as to type and/or quantity of hydrocarbons.

The temperature of the gas sample may be varied to effect particular reaction conditions. For example, to control a particular hydrocarbon mix in a gas supply, the temperature of the gas irradiated may be varied between say 5 and 95° C. whereby the specific undesired hydrocarbons may be selectively converted and eliminated from the gas. To accomplish temperature conditioning the gas may be passed through a heat exchanger such as temperature control 40 connected to conditioning zone 12 through line 42.

A further conditioning of the incoming gas stream to the reaction zone 28 may be effected by incorporating and dispersing a nonreactive, particulate material e.g. salt crystals, submicron and preferably monodisperse polymers or other air suspendable matter into the gas. Thus a supply 22 of nonreactive additive dispersant to the conditioning zone 12 along line 24 may be provided for selective and specialized conditioning of gases.

It is to be noted that use of each of the foregoing additives is dependent on the characteristics of the gas to be treated and the expected environment. In all cases the addition is desirably accomplished upstream of the reaction zone 28 so that a homogeneous gas is irradiated.

On passing from the reaction zone 28, the gas sample, now containing chemically combined oxyreactive hydrocarbons is passed along line 30 into a collection zone 34. Additional agglomerate development will be realized if a residence time is provided downstream of the reaction zone 28. This may be accomplished in a dwell zone 32 between the reaction zone 28 and collection zone 34. Collection zone 34 is representative of any of the various devices useful for separating particles from a gas stream, e.g. by centrifugation or impaction. The reaction zone 28 is typically operated to combine from 100 to 5000 monomer units into a larger chemical entity. This entity is believed to be a polymer which may or may not contain chemically combined nitrogen, sulfur or oxygen, and which tends to agglomerate into particles which are so much larger than their monomers that separation is readily achieved, e.g. by impinging on a surface ballistically or through electrostatic attraction where the normally liquid particles will coalesce. It will be remembered that the synthetically produced aerocolloid from reaction zone 28 is a dispersion in a gas of separable, albeit nonsettling particulate matter.

In FIG. 2 a conditioned air system supplying specially treated air to a room such as a clean room is depicted. "Clean rooms" are areas where highly critical assembly e.g. electronic parts assembly, operations are carried out. Removal of airborne matter from these rooms is a necessity. The presence of molecularly disperse oxyreactive hydrocarbons can directly or indirectly through reaction, affect the sensitive materials present. Accordingly, in one aspect of the present invention an air conditioning system is provided in which air to be provided to a controlled environment space is treated prior to distribution in the space to separate from the supplied air oxyreactive hydrocarbons. To do this, equipment is provided including a blower 44 typical of otherwise useful conditioning blowers to act as an air supply, and conduit 46 leading therefrom, an irradiation generating reactor 281 including a tubular chamber 48 communicating with conduit 46 and having a coaxially alined lamp 50 adapted to emit far ultraviolet radiation and connected to a power supply 381. Downstream of the reactor 281 a collector 341 is provided, also in communication with conduit 46 in which the particles generated in the reactor are eliminated from the air by collection. The air then passes into room 152 through inlet 54 whence it is swept across the room and through outlet 56 for discharge or for recycle and retreatment. The collector 341 may be emptied periodically to remove the accumulated particles.

In FIG. 3 an auto or truck exhaust system is depicted. The most prevalent source of air pollution today is the automobile. By law, automobiles are required to minimize output of hydrocarbons e.g. to less than 2000 parts per million. This quantity of hydrocarbon, however, when multiplied by the number of vehicles in use becomes quite formidable. Thus, the answer is not to limit hydrocarbon emission to some such relatively high value which is nonetheless the technological frontier, but to destroy the pollution-causing potential of the exhaust gases by operating on the troublesome components of the exhaust selectively.

Thus, with reference to FIG. 3, exhaust from typical internal combustion engine 58 exiting through manifold 60 and exhaust pipe 62 passes temperature conditioner 64 in which its temperature is lowered e.g. to 95° C. and advances on irradiating reactor 282. Prior to reaching the reactor 282, the exhaust gases are injected with a calibrated quantity of oxygen from oxygen injector 142 to bring oxygen levels to the desired concentration. In reactor 282 the exhaust gases are dosed with far ultraviolet irradiation as explained above with the result of massive generation of separable particles selectively from components of the gases which have smog-forming potential, i.e. oxyreactive hydrocarbons. The particles produced are carried along with the exhaust gases in pipe 62 to collector 342 in which the gases and particles are separated from one another, only the former being released to the atmosphere. The particles are generally coalesced into a liquid or collected as a solid and are deposited on the roadway or periodically removed from the vehicle.

In FIG. 4, still another embodiment of the invention is shown. There, chemical process vessel 66 which is representative of any container for organic solvents alone or with other materials such as mixing, storage or reaction tanks, has a product outlet 68 and a vent 70 to the atmosphere. A gas containing molecularly disperse oxyreactive hydrocarbons as well as possibly other vapors is emitted to the vessel headspace 74 from the organic solvents in the vessel. This gas is normally vented up vent 70 to the atmosphere. Absence of means of control over vented hydrocarbons has led some localities to restrict the solvents which may be used in various industrial plants. This invention affords an alternative to the costly special formulating these restrictive ordinances entail. There is provided a communication with the vent 70 an injector 183 for introducing water as and if needed into the vent gas, and an injector 143 for introducing oxygen as and if needed into the vent gas, due precautions for explosion hazards being taken. Also, in communication with the vent 70 is irradiator 283 having a far ultraviolet radiation producing lamp 503 alined therein to irradiate the vent gases. Such irradiation, as explained above, produces particles from the oxyreactive hydrocarbons in the vent gases. These separable organics are collected in the collector 343 and the remainder of the gas passes to the atmosphere, its pollution potential reduced.

In carrying out the method of the invention as with any of the just-described apparatus, a gas to be released to the atmosphere is passed or drawn through an irradiation zone from a source such as a reactor or auto engine. Prior to such passage the gas is preferably conditioned to a predetermined humidity, temperature and content of oxygen, and particulates by appropriate additions and deletions, e.g. through filtering.

The conditioned sample is passed through the irradiation zone in a manner providing the desired dosage of radiation. The dosage will be dependent on the degree of oxyreactive hydrocarbon extraction desired, e.g. 100 or 5000 combined monomer units, the molecular weight of the predominant monomer species, e.g. $C_5$ or $C_8$ or other, rapidity of reaction desired, and use or not of dwell in zone 32.

Following radiation, the now separable particle containing gas stream is passed to the collector for separation.

EXAMPLE

A gas containing 1 to 100 parts per million of the oxyreactive hydrocarbon zylene and essentially free of nitrogen oxides was treated to convert the hydrocarbon into separable particles. The gas at 25° C. and 760° mm. Hg pressure was adjusted to a relative humidity of 50%. Oxygen content was approximately 20% by volume. The sample was passed through an annular passage surrounding a quartz-mercury vapor lamp emitting radiation 96% at 2537 A. Power supply was between 5 and 50 watts per 600 milliliters of the gas. The flow conditions were laminar so that as radiation intensity decreased outwardly from the lamp the velocity of the gas along the passage also decreased so that radiation of all parts of the sample was quite uniform. The mean exposure duration was less than one minute. A formation of liquid particles easily separable by impingement on a metal surface was obtained. Particle size was estimated at between 0.5 and $1\mu$. The particulates were precipitated by impactions on a slide and tested for solubility in xylene, (not soluble), and acetone (soluble), indicating the partial photochemical conversion of the xylene into compounds with a large tendency to polymerize.

A second portion of the precipitated particles was exposed to ultraviolet irradiation for several hours. This caused a gradual decrease of particle size and their ultimate volatilization into gaseous end products.

In summary, method and means for discriminatingly separating trace quantities of oxyreactive from oxy-nonreactive hydrocarbons in a gas is provided. The oxyreactive hydrocarbons are selectively converted by photo-oxidation into polymers and then, by agglomeration, into separable particles, while the nonreactive hydrocarbons remain molecularly disperse and the gas is otherwise unaffected for release into the atmosphere with reduced pollution potential.

I claim:

1. Method of treating an effluent gas stream to be released to the atmosphere to lower its content of molecularly disperse oxyreactive hydrocarbons which includes irradiating the gas stream with far ultraviolet radiation to selectively combine said oxyreactive hydrocarbons therein into separable particulates comprising said hydrocarbons and at least $0.1\mu$ in diameter, separating said particulates from the gas stream and thereafter releasing the gas stream to the atmosphere.

2. Method according to claim 1 in which said irradiating is carried out at less than 2850 angstroms wavelength.

3. Method according to claim 1 in which said oxyreactive hydrocarbons are copolymerized with oxygen to form polymers.

4. Method according to claim 3 in which said polymers are agglomerated to form said separable particulates.

5. Method according to claim 1 in which said separating of particulates is effected by collecting said particulates on a surface.

6. Method according to claim 1 including also further irradiating said particulates with far ultraviolet radiation to convert the same to innocuous gases.

7. Method according to claim 1 including also maintaining molecularly disperse water in the gas stream during irradiation.

8. Method according to claim 1 including also maintaining dispersed finely divided solids in the gas stream during irradiation.

9. Method of treating gaseous effluent of a chemical process normally containing molecularly disperse oxyreactive hydrocarbon prior to releasing the effluent into the atmosphere including the steps of subjecting the effluent gas to far ultraviolet radiation principally in the wavelength range of 2000 to 2850 angstroms in the presence of 10 parts of oxygen per part of oxyreactive hydrocarbon, chemically combining the oxygen and oxyreactive hydrocarbons present into polymers, combining said polymers into detectable particulates comprising said polymers and at least $0.1\mu$ in diameter and separating said particulates from the effluent gas prior to releasing said gas to the atmosphere.

10. Method according to claim 9 in which said particulates contain from 100 to 5000 combined hydrocarbon units.

11. Method according to claim 10 in which said particulates are below about $1\mu$.

12. Method according to claim 9 in which molecularly disperse water is present in the gas during irradiation in an amount increasing the production of said particulates.

13. Method according to claim 12 in which the gas being irradiated has a humidity between 0 and 99%.

14. Method according to claim 13 in which said gas being irradiated has a temperature between 5° and 95° C.

15. Method according to claim 14 in which said gas being irradiated is at atmospheric pressure.

16. Method according to claim 14 including also maintaining suspended in the gas being irradiated finely divided solids to act as reaction centers.

17. Method according to claim 9 in which said oxyreactive hydrocarbons are present in the effluent gas during irradiation in an amount between 1 and 100 parts per million and oxygen is present in an amount between 15% and 30% by volume.

18. Method according to claim 9 in which irradiation is carried out to form liquid polymers and including also coalescing said polymers on a surface to effect separation thereof from the gas.

19. Method of treating exhaust gases of internal combustion engines to reduce the content of oxyreactive hydrocarbons therein prior to release of said gases to the atmosphere which includes irradiating said exhaust gases with far ultraviolet radiation to combine the oxyreactive hydrocarbons molecularly dispersed therein into separable particulates comprising said hydrocarbons and at least $0.1\mu$ in diameter and separating said particulates from the exhaust gas prior to releasing the exhaust gas to the atmosphere.

20. Method according to claim 19 including also introducing ten parts of oxygen per part of oxyreactive hydrocarbon into the exhaust gas prior to irradiation thereof.

21. Method according to claim 19 including also rapidly lowering the temperature of said gas prior to irradiation to less than about 100° C.

22. Method according to claim 21 in which said temperature lowering step includes increasing the volume of the gas.

23. Method according to claim 21 including also injecting air into said exhaust gas prior to irradiation to increase oxygen levels to between 15% and 30% by volume.

24. Method of conducting a chemical process normally releasing molecularly disperse oxyreactive hydrocarbon containing gaseous effluent into the atmosphere to reduce output of such hydrocarbons which includes confining the effluent in a treating zone, irradiating the effluent so confined with far ultraviolet radiation to selectively combine said oxyreactive hydrocarbons therein into separable particulates comprising said hydrocarbons and at least $0.1\mu$ in diameter, separating said particulates from the effluent gases and thereafter releasing the gases to the atmosphere.

25. Method according to claim 24 including also maintaining the oxygen level in said gases during irradiation above 10 parts per part of oxyreactive hydrocarbon.

26. Method according to claim 25 including also maintaining molecularly disperse water in said gases during irradiation.

27. Method according to claim 26 including also maintaining the temperature of the gases at less than about 100° C. during irradiation.

References Cited
UNITED STATES PATENTS

| | | | |
|---|---|---|---|
| 2,003,898 | 6/1935 | Mitscherling | 204—162 |
| 2,762,768 | 9/1956 | Cier | 204—162 |
| 3,109,800 | 11/1963 | Sharp | 204—162 |

BENJAMIN R. PADGETT, Primary Examiner